United States Patent [19]
Kim

[11] Patent Number: 5,968,156
[45] Date of Patent: Oct. 19, 1999

[54] PROGRAMMABLE PERIPHERAL COMPONENT INTERCONNECT (PCI) BRIDGE FOR INTERFACING A PCI BUS AND A LOCAL BUS HAVING RECONSTRUCTABLE INTERFACE LOGIC CIRCUIT THEREIN

[75] Inventor: Sun-o Kim, Suwon, Rep. of Korea

[73] Assignee: Samsung Electronics Co., Ltd., Rep. of Korea

[21] Appl. No.: 09/063,428

[22] Filed: Apr. 21, 1998

[30] Foreign Application Priority Data

Jul. 25, 1997 [KR] Rep. of Korea ............ 97-35214

[51] Int. Cl.$^6$ ............................................ G06F 13/00
[52] U.S. Cl. ..................................... 710/129; 710/130
[58] Field of Search ............................. 395/280, 281, 395/284, 306, 308, 309, 310, 821, 828; 710/100, 101, 104, 126, 128, 129, 130, 1, 8

[56] References Cited

U.S. PATENT DOCUMENTS

| | | | |
|---|---|---|---|
| 5,446,869 | 8/1995 | Padgett et al. | 395/500 |
| 5,499,346 | 3/1996 | Amini et al. | 395/308 |
| 5,557,758 | 9/1996 | Bland et al. | 395/308 |
| 5,568,619 | 10/1996 | Blackledge et al. | 395/281 |
| 5,632,021 | 5/1997 | Jennings et al. | 395/309 |
| 5,642,489 | 6/1997 | Bland et al. | 395/308 |
| 5,664,124 | 9/1997 | Katz et al. | 395/309 |
| 5,666,556 | 9/1997 | Khandekar et al. | 395/823 |
| 5,678,065 | 10/1997 | Lee et al. | 395/880 |
| 5,737,524 | 4/1998 | Cohen et al. | 395/309 |
| 5,761,462 | 6/1998 | Neal et al. | 395/309 |

Primary Examiner—Ayaz R. Sheikh
Assistant Examiner—Xuan M. Thai
Attorney, Agent, or Firm—Burns, Doane, Swecker & Mathis LLP

[57] ABSTRACT

A peripheral component interconnect (PCI) bridge which interfaces between PCI and local buses to provide a communicator for performing a communication between peripheral devices connected to the PCI bus and system devices connected to the local bus, is provided. The PCI bridge comprising a PCI register which is initialized according to a reset signal from the PCI bus and then stores configuration information on the PCI bus, a local register which is initialized according to a reset signal from the PCI bus and then stores configuration information on the local bus, PCI bus interface logic for performing interfacing according to the configuration information stored in the PCI register, local bus interface logic for performing interfacing according to the configuration information stored in the local register, and a logic transformer for reconstructing the PCI bus interface logic according to a command input from a user.

3 Claims, 5 Drawing Sheets

PROGRAMMABLE PERIPHERAL COMPONENT INTERCONNECT (PCI) BRIDGE FOR INTERFACING A PCI BUS AND A LOCAL BUS HAVING RECONSTRUCTABLE INTERFACE LOGIC CIRCUIT THEREIN

BACKGROUND OF THE INVENTION

1. Field of the Invention

The present invention relates to a PCI (peripheral component interconnect) bridge for interfacing a PCI bus and a local bus, and more particularly, to a PCI bridge which can accommodate a problem, such as a change of a PCI bus standard, by reconstructing interface logic.

2. Description of Related Art

In general, information handling system includes more than one bus, and devices connected to each bus perform communication such as data transmission via the buses. For example, a typical computer system includes a local bus to which a central processing unit (CPU) is attached, and the CPU communicates with other devices connected to the local bus, through the local bus. Meanwhile, such a system may also include one or more peripheral buses such as a peripheral component interconnect (PCI) bus. Peripheral devices such as an input/output device, etc. are connected to the peripheral bus.

However, the local and peripheral buses use different standards to conduct data transfer between devices connected to these buses and different devices. Also, the respective buses are manufactured in accordance with different standards. A device for interfacing buses which use different standards is called a bridge. In particular, a bridge for interfacing a local bus and a PCI bus is called a PCI bridge.

FIG. 1 is a schematic block diagram of a computer system including a PCI bridge. Referring to FIG. 1, a central processing unit (CPU) 101, a memory 102 and a local peripheral device 103 are connected to a local bus 100 along with various other devices (not shown). A PCI peripheral device 111 is connected to a PCI bus 110. The local bus 100 is connected to the PCI bus 110 via a PCI bridge 120. In such a system, the PCI bridge 120 interfaces the local and PCI buses 100 and 110. That is, in transmitting data, addresses and control signals between the two buses, the PCI bridge 120 overcomes the inconsistency between the standards of two buses.

FIG. 2 is a block diagram of a conventional PCI bridge 200. The conventional PCI bridge 200 includes PCI and local registers 210 and 220 which store configuration information on the PCI bus and on the local bus, respectively, when the PCI bridge is initialized according to a reset signal from the PCI bus 110. Also, the conventional PCI bridge 200 further includes PCI bus interface logic 230 for reading the configuration information stored in the PCI register 210 according to a PCI bus cycle and outputting a request command such as an address designation, read command or write command, and local bus interface logic 240 for reading information stored in the local register 220 according to the PCI bus cycle and performing interfacing according to the request command from the PCI bus interface logic 230. In the conventional PCI bridge 200 having such components, the configuration information to be stored in the PCI and local registers 210 and 220 is stored in a serial EEPROM (not shown) connected to the PCI bridge 200, and the configuration information is written to the PCI and local registers 210 and 220 according to the reset signal from the PCI bus 110. The above-described process in which the PCI bridge 200 reads the configuration information from the serial EEPROM and writes the same to the PCI and local registers 210 and 220 is referred to as an initialization.

The initialization of the PCI bridge 200 will now be described referring to FIG. 3.

When power is switched on, a reset signal is received from the PCI bus 110, in step 300. Next, the PCI and local registers 210 and 220 read the configuration information from the serial EEPROM in step 310, and then set the PCI and local buses 110 and 100 in step 320. After the initialization is accomplished, the PCI bridge 200 performs interfacing according to a command cycle from the PCI bus 110.

The conventional PCI bridge 200 is comprised of a logic circuit composed only of registers, so all PCI standards must be supported upon designing and manufacturing the conventional PCI bridge. However, the PCI standards of manufacturing companies are not consistent, and are also continuously upgraded. Such up-grades may be downward-compatible, but often that is not possible due to the nature of the technical advances between versions. Therefore, the bridges must be continuously upgraded, a user must avoid using particular functions, or the BIOS of an applied system must be changed.

SUMMARY OF THE INVENTION

It is an object of the present invention to provide a PCI bridge which can transform a PCI bus interface logic to easily accommodate changes in the PCI bus standard and defects in the PCI bus design.

To accomplish the above object, there is provided a peripheral component 10 interconnect (PCI) bridge which interfaces between PCI and local buses to provide a communicator for performing a communication between peripheral devices connected to the PCI bus and system devices connected to the local bus, the PCI bridge comprising: a PCI register which is initialized according to a reset signal from the PCI bus and then stores configuration information on the PCI bus; a local register which is initialized according to a reset signal from the PCI bus and then stores configuration information on the local bus; PCI bus interface logic for performing interfacing according to the configuration information stored in the PCI register; local bus interface logic for performing interfacing according to the configuration information stored in the local register; and a logic transformer for reconstructing the PCI bus interface logic according to a command input from a user.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 4:
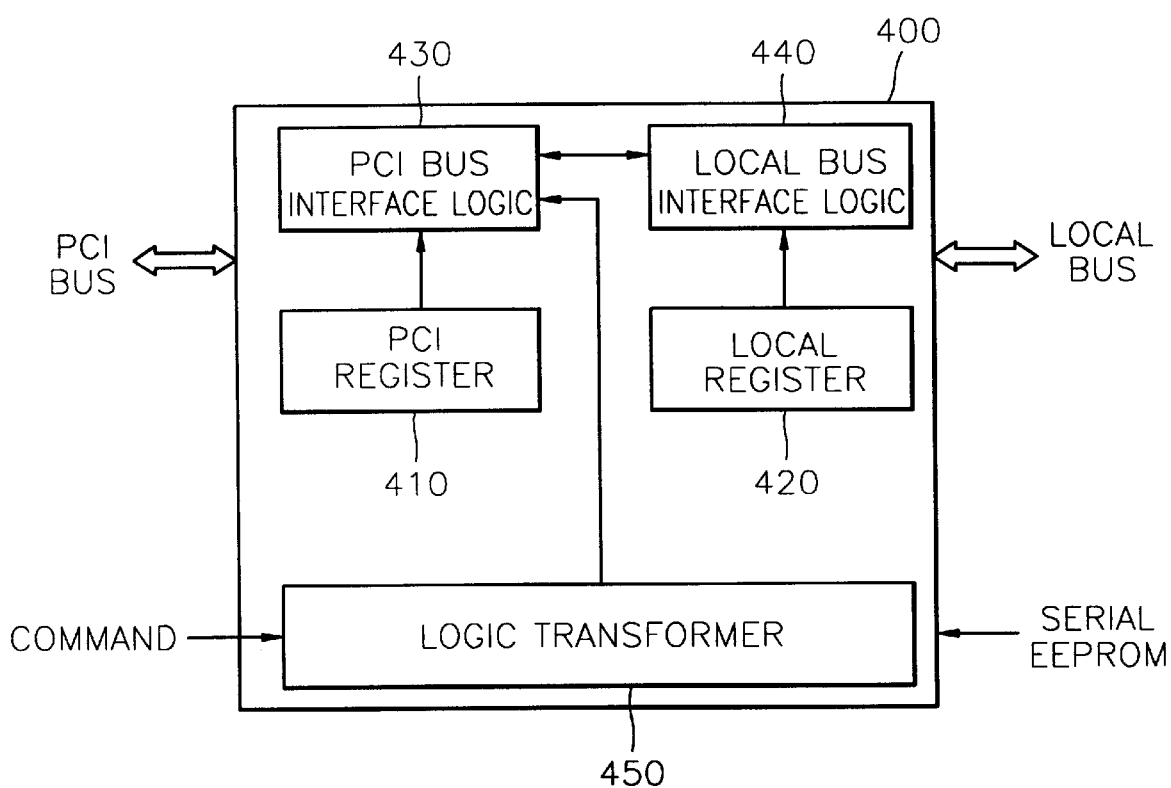
FIG. 4 is a block diagram showing the configuration of a PCI bridge according to the present invention.

Referring to FIG. 4, a PCI bridge 400 according to the present invention includes a PCI register 410, a local register 420, PCI bus interface logic 430, local bus interface logic 440 and a logic transformer 450.

The PCI register 410 is initialized according to a reset signal from a PCI bus, and thus stores configuration information on the PCI bus. The local register 420 is initialized according to the reset signal from the PCI bus, and thus stores configuration information on the local bus. The PCI and local bus interface logic 430 and 440 perform interfacing according to the configuration information stored in the PCI and local registers 410 and 420, respectively. The logic transformer 450 reconstructs the PCI bus interface logic according to a command from a user.

Figure 1:
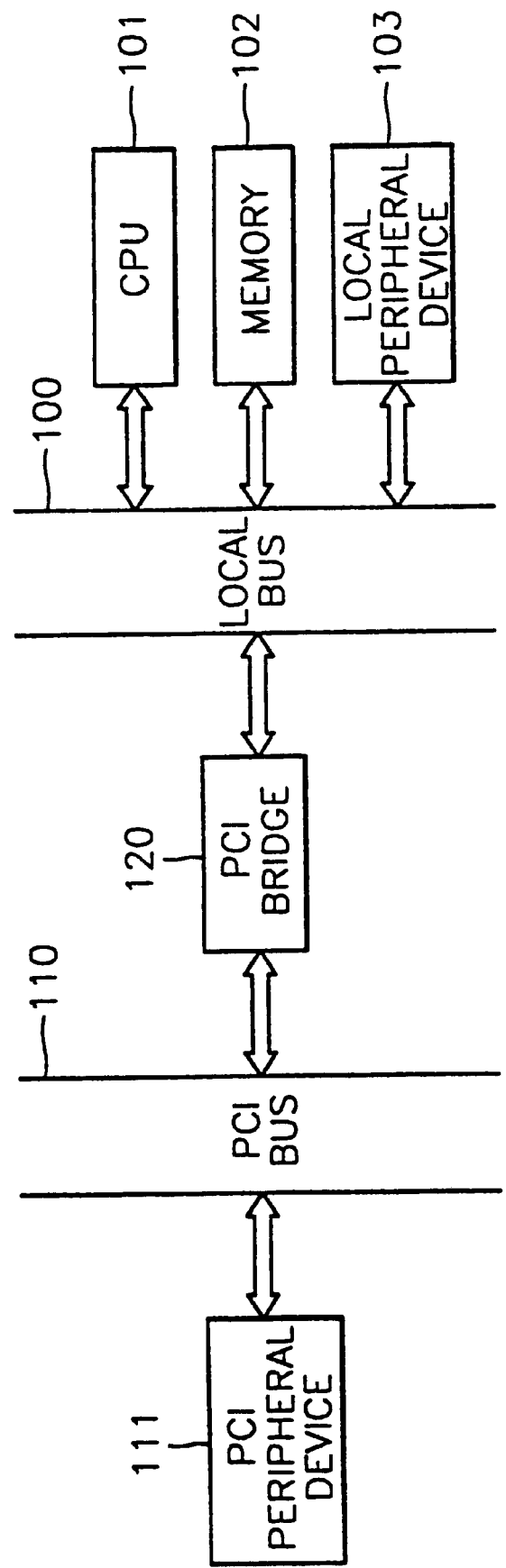
FIG. 1 is a block diagram of an information processing system having a PCI bridge.
Figure 2:
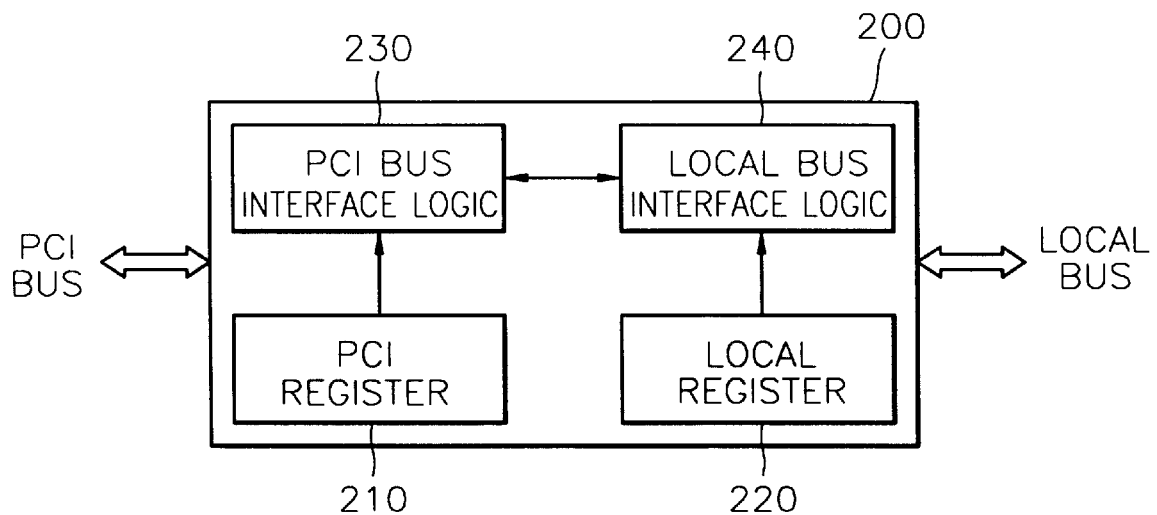
FIG. 2 is a block diagram showing the configuration of a conventional PCI bridge.
Figure 3:
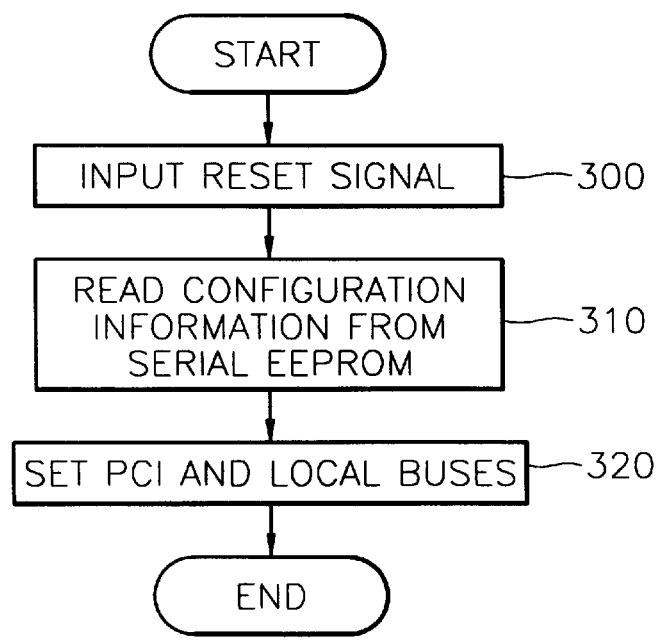
FIG. 3 is a flowchart outlining a process for initializing the conventional PCI bridge.

The PCI bridge 400 having such a configuration is initialized, and then interfaces the PCI and local buses 110 and 100 of FIG. 1. Here, the initialization means that the configuration information of the PCI and local buses are stored in the PCI and local registers 410 and 420, respectively.

As the PCI bridge 400 is initialized, the PCI register 410 stores the configuration information of the PCI bus, and the local register 420 stores the configuration information of the local bus, e.g., the timing of the local bus, the bus width, the wait state thereof, etc. The PCI bus interface logic 430, constituted of a respective state logic circuit depending on the configuration information, serves as a slave with respect to the PCI bus 110 or the PCI peripheral device 111, to transmit a signal such as an address or data to the local bus interface logic 440. The local bus interface logic 440 having received such a signal serves as a master with respect to the local bus 100 or the peripheral devices 101, 102 and 103 connected to the local bus 100, and performs interfacing. Meanwhile, when interfacing is performed in the opposite direction to the above-described interfacing direction, the PCI and local bus interface logics 430 and 440 perform opposite operations.

In the PCI bridge performing the interfacing, when the standard of the PCI bus is upgraded or a manufacturing error is generated, the state logic circuit of the PCI bus interface logic 430 performing the interfacing operation is reconstructed by the logic transformer 450.

Figure 5:
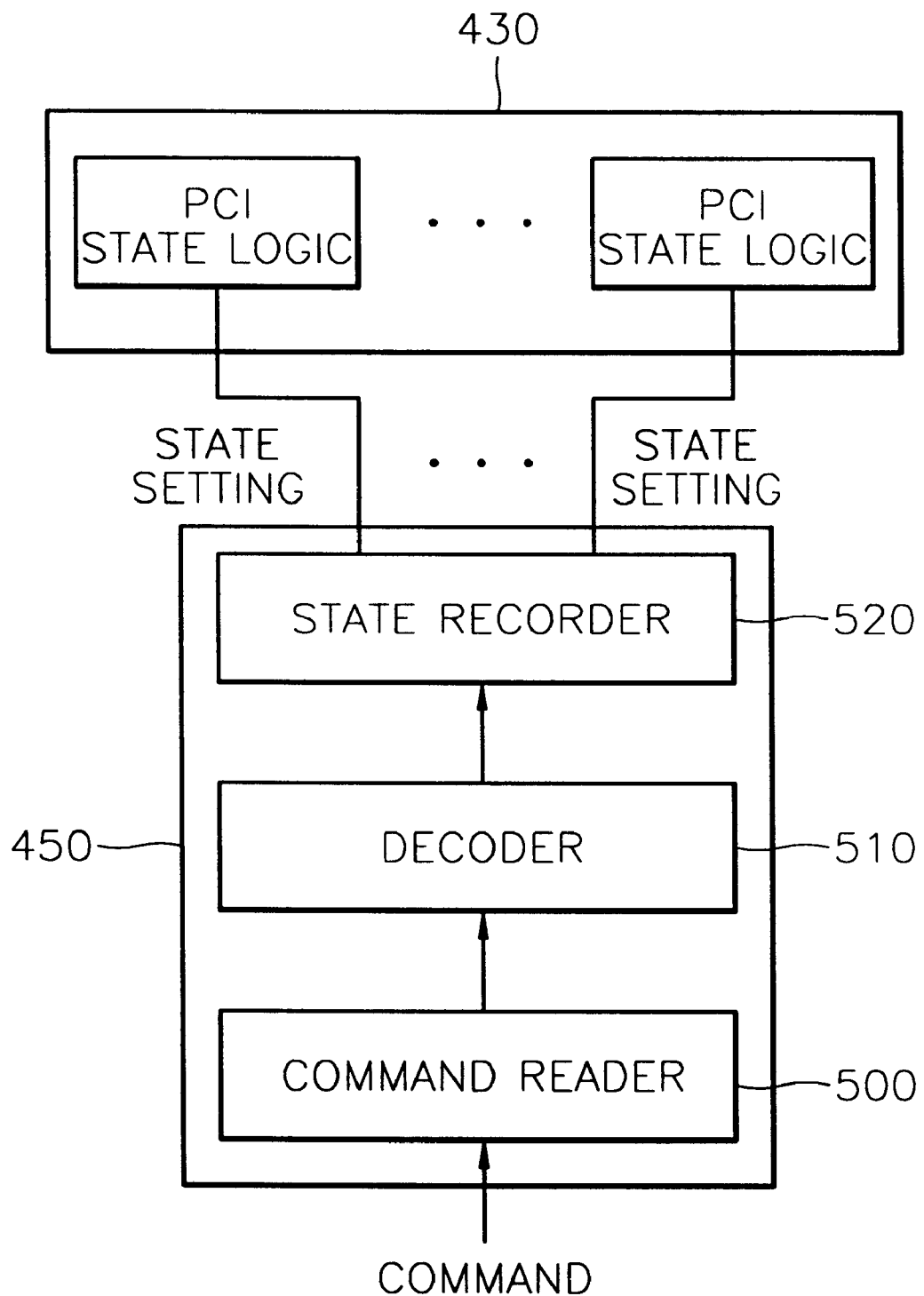
FIG. 5 is a block diagram showing the configuration of the logic transformer shown in FIG. 4.

FIG. 5 schematically shows the internal configuration of the logic transformer 450. Referring to FIG. 5, the logic transformer 450 includes a command reader 500 for accessing an input command, a decoder 510 for transforming the accessed command into an interpreted code, and a state recorder 520 for outputting a state setting signal for reconstructing the state logic circuit within the PCI bus interface logic 430 according to the interpreted code.

Figure 6:
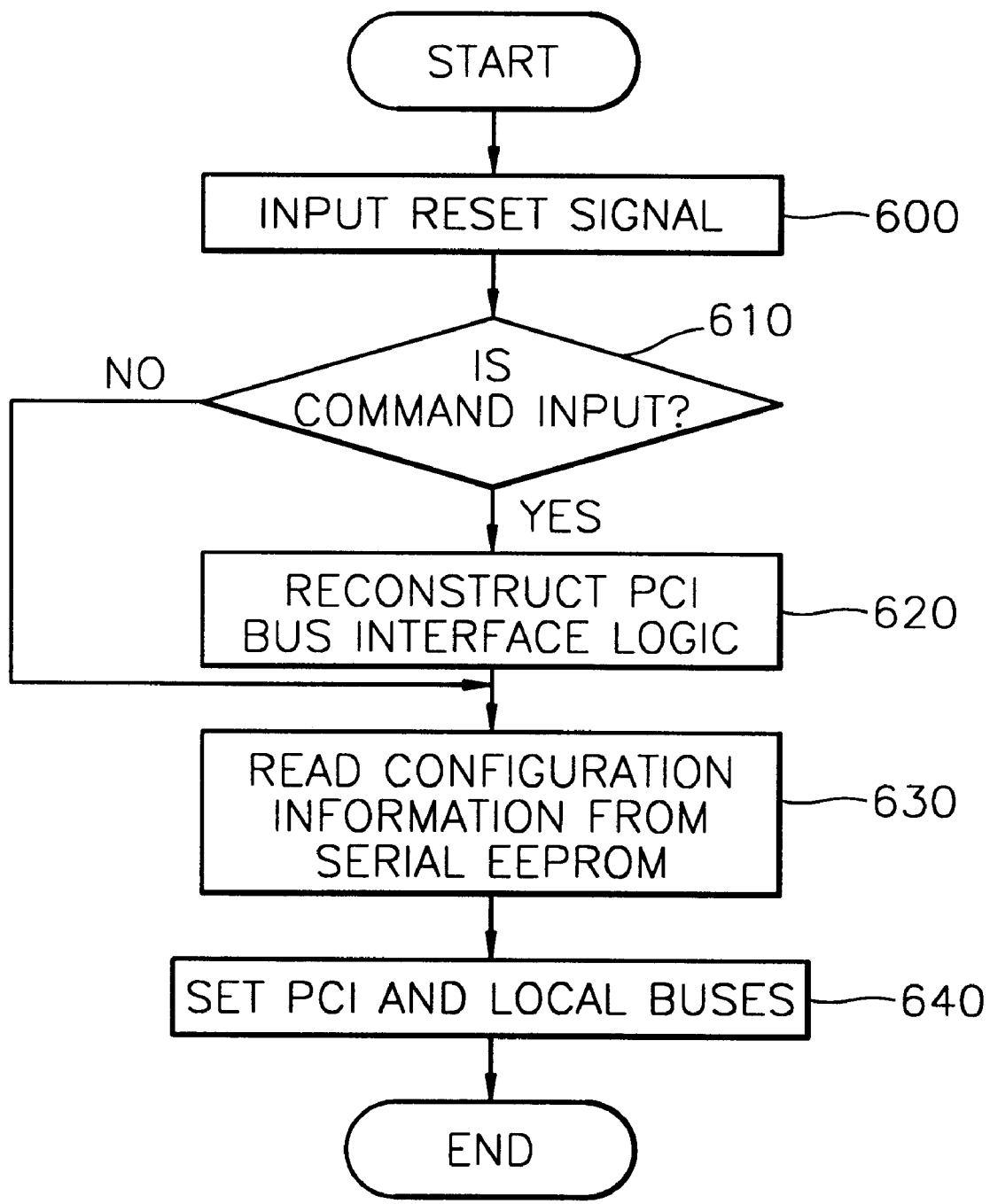
FIG. 6 is a flowchart outlining a process for initializing the PCI bridge shown in FIG. 4.

The reconstruction of the state logic circuit within the PCI bus interface logic 430 by the logic transformer 450 is performed in the initializing process, which is shown in a flowchart of FIG. 6. Referring to FIG. 6, when power is switched on, the PCI bus 110 outputs a reset signal to the PCI bridge 400 in step 600. The PCI bridge 400 performs initialization after receiving the reset signal from a reset signal line of the PCI bus 110. According to the initialization, the PCI bridge 400 checks if a command is input from a user, in step 610. If a command is not input from a user, i.e., at the state of command passage, the PCI register 410 reads and stores configuration information on the PCI bus standard from a serial EEPROM being an external memory, in step 630. Also, in step 630, the local register 420 reads and stores configuration information on the local bus from the serial EEPROM. Thus, the PCI and local buses 110 and 100 are set, in step 640. However, when it is determined in step 610 that a command is input from a user, the PCI bridge 400 reads the input command and writes the same to the PCI bus interface logic 430 to reconstruct the PCI bus interface logic 430, in step 620. Such a reconstruction is made by the logic transformer 450. That is, when the command is input to the logic transformer 450, it is accessed by the command reader 500, and then transformed into an interpreted code by the decoder 510. The code output from the decoder 510 outputs a state setting signal to the PCI bus interface logic 430 by means of the state recorder 520, thereby reconstructing the state logic circuit within the PCI bus interface logic 430. After this process, the PCI register 410 reads and stores the configuration information on the PCI bus standard from the serial EEPROM. The local register 420 reads and stores the configuration information on the local bus from the serial EEPROM in step 630, and sets the PCI and local buses 110 and 100 in step 640. Then, if a signal is input from the PCI bus, an interfacing operation is performed by the newly changed logic.

After a user stores a predetermined command in the serial EEPROM connected to the PCI bridge 400, the stored command can be accessed by the logic transformer 450.

Now, a comparison will be made of accessing an expansion ROM (being the PCI bus standard) using the PCI bridge according to the present invention and using the PLX9050 of PLX Technology Inc. as a conventional PCI bridge. Here, the expansion ROM is a memory for storing programs which are not supported by a BIOS ROM.

According to the PCI standard, the PCI bus 110 is set by writing specific data to an expansion ROM register portion of the PCI register of the PCI bridge 120. Whenever the expansion ROM is accessed, the PCI bus 110 reads the specific data from the PCI register to check if the expansion ROM is set or not. At this time, if the PCI bridge 120 allocates the expansion ROM area to 256 bytes, a predetermined value is read from the PCI bus 110. When the PCI bus 110 confirms that the expansion ROM is set, a set least significant bit value is again written to the PCI register in order to activate the expansion ROM.

However, since the PLX9050 sets the least significant bit of the expansion ROM register to an address decode enable bit, it does not operate if the least significant bit is not set to 1. Thus, if the PCI bus 110 sets the expansion ROM area of the PCI register inside the PLX9050 according to the PCI standard, the PLX9050 does not operate since the least significant bit is not set to 1. In this case, data read by the PCI bus 110 to confirm whether the expansion ROM is set becomes a value having a least significant bit of 0, so that the PCI bus 110 determines that the PLX9050 has no expansion ROM. Therefore, the function of the expansion ROM connected to the PLX9050 cannot be utilized.

However, if the PCI bridge 400 according to the present invention is used, a user inputs a command and changes the interface logic using the logic transformer 450. Thus, the above-described problem can be solved.

The present invention has been described referring to the embodiment shown in the drawings, but the embodiment is only an example. It is apparent that various modifications and other equivalent embodiments may be effected by those skilled in the art. Therefore, the actual technical protection scope of the present invention must be determined by the attached claims.

As described above, the present invention can change a state logic circuit by performing a command, and thus easily accommodate changes in the PCI bus standard or errors in the PCI bus manufacturing without any correction of the system BIOS.

What is claimed is:

1. A peripheral component interconnect (PCI) bridge which interfaces between PCI and local buses to provide a communicator for performing a communication between peripheral devices connected to the PCI bus and system devices connected to the local bus, the PCI bridge comprising:

a PCI register which is initialized according to a reset signal from said PCI bus and then stores configuration information on said PCI bus;

a local register which is initialized according to a reset signal from said PCI bus and then stores configuration information on said local bus;

PCI bus interface logic for performing interfacing according to the configuration information stored in said PCI register and wherein said PCI bus interface logic includes state logic circuits which perform interfacing operations in both directions;

local bus interface logic for performing interfacing according to the configuration information stored in said local register; and a logic transformer for reconstructing said PCI bus interface logic according to a command input from a user, wherein said logic transformer processes a command from said user and reconstructs said state logic circuits by generating a state setting signal with respect to each of said state logic circuits within said PCI bus interface logic, and said logic transformer comprising:

a command reader for accessing a command input from the user;

a decoder for decoding data from said command reader into an interpreted code; and a state recorder for outputting said state setting signals according to the interpreted code output by said decoder.

2. The PCI bridge according to claim 1, wherein said logic transformer reconstructs said PCI bus interface logic using a command input from an external memory.

3. The PCI bridge according to claim 2, wherein said external memory is a serial EEPROM.

* * * * *